(12) United States Patent
Park et al.

(10) Patent No.: US 10,075,858 B2
(45) Date of Patent: Sep. 11, 2018

(54) WEIGHTED RSRP MEASUREMENT

(71) Applicant: Telefonaktiebolaget L M Ericsson (publ), Stockholm (SE)

(72) Inventors: Chester Park, San Jose, CA (US); Stephen Grant, Pleasanton, CA (US); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1097 days.

(21) Appl. No.: 13/623,170

(22) Filed: Sep. 20, 2012

(65) Prior Publication Data

US 2014/0078912 A1    Mar. 20, 2014

(51) Int. Cl.
*H04L 12/26* (2006.01)
*H04W 24/08* (2009.01)
(Continued)

(52) U.S. Cl.
CPC .......... *H04W 24/08* (2013.01); *H04J 11/005* (2013.01); *H04L 5/0048* (2013.01);
(Continued)

(58) Field of Classification Search
CPC . H04W 36/0083; H04W 36/30; H04W 36/14; H04W 36/0055; H04W 36/24
(Continued)

(56) References Cited

U.S. PATENT DOCUMENTS

2007/0153834 A1* 7/2007 Qu ........................ H04L 5/0007
370/478

2009/0316659 A1* 12/2009 Lindoff ................ H04J 11/0069
370/332
(Continued)

FOREIGN PATENT DOCUMENTS

WO    2010125064 A1    11/2010
WO    2011130665 A1    10/2011
(Continued)

OTHER PUBLICATIONS

International Search Report and Written Opinion for PCT/IB2013/058584, dated Jul. 3, 2014, 16 pages.
(Continued)

*Primary Examiner* — Andrew Chriss
*Assistant Examiner* — Atique Ahmed
(74) *Attorney, Agent, or Firm* — Withrow & Terranova, PLLC

(57) ABSTRACT

Systems and methods are disclosed for measuring received signal power at a mobile terminal in a cellular communications network in such a manner as to efficiently provide highly accurate received signal power measurements in the presence of strong inter-cell interference. In one embodiment, in order to measure received signal power for a measured cell, a mobile terminal selects weighting parameters for a number of time-frequency samples of a reference signal of the measured cell based, at least in part, on inter-cell interference from one or more synchronized interfering cells and inter-cell interference from one or more non-synchronized interfering cells. The mobile terminal applies the time-frequency samples of the reference signal of the measured cell and the corresponding weighting parameters to corresponding time-frequency samples of a received signal from the measured cell in order to obtain a measurement of the received power for the measured cell.

23 Claims, 10 Drawing Sheets

(51) Int. Cl.
*H04J 11/00* (2006.01)
*H04W 36/00* (2009.01)
*H04L 27/26* (2006.01)
*H04L 5/00* (2006.01)
*H04B 17/318* (2015.01)

(52) U.S. Cl.
CPC ........ H04L 5/0073 (2013.01); H04L 27/2613 (2013.01); H04W 36/0094 (2013.01); H04B 17/318 (2015.01); *H04L 5/0007* (2013.01); *Y02D 70/1262* (2018.01)

(58) Field of Classification Search
USPC .......................... 370/252, 336; 455/436, 425
See application file for complete search history.

(56) References Cited

U.S. PATENT DOCUMENTS

| | | | | |
|---|---|---|---|---|
| 2010/0279638 | A1* | 11/2010 | Lindoff | H04L 25/0204 455/226.1 |
| 2010/0317343 | A1* | 12/2010 | Krishnamurthy | G01S 1/30 455/435.1 |
| 2011/0103350 | A1 | 5/2011 | Lindoff | |
| 2011/0117925 | A1* | 5/2011 | Sampath | H04W 64/00 455/456.1 |
| 2011/0176440 | A1* | 7/2011 | Frank | H04W 64/00 370/252 |
| 2012/0115463 | A1* | 5/2012 | Weng | H04L 1/0026 455/425 |
| 2012/0172041 | A1* | 7/2012 | Krishnamurthy | H04J 11/005 455/436 |
| 2013/0051373 | A1* | 2/2013 | Ro | H04W 48/16 370/336 |
| 2013/0273912 | A1* | 10/2013 | Xu | H04W 24/08 455/434 |
| 2014/0024388 | A1* | 1/2014 | Earnshaw | H04L 5/0073 455/452.2 |

FOREIGN PATENT DOCUMENTS

| | | |
|---|---|---|
| WO | 2012047909 A1 | 4/2012 |
| WO | 2012092060 A1 | 7/2012 |

OTHER PUBLICATIONS

Examination Report for European Patent Application No. 13798743.4, dated Jul. 5, 2018, 9 pages.

* cited by examiner

WEIGHTED RSRP MEASUREMENT

FIELD OF THE DISCLOSURE

The present disclosure relates to measuring received signal power at a mobile terminal in a cellular communication network.

BACKGROUND

Cellular communications networks provide voice and data services to hundreds of millions of users throughout the world. In response to the ever increasing demands for higher data rates, fourth generation (4G) cellular communications are being designed and deployed. One type of 4G cellular communications network is a Long Term Evolution (LTE) cellular communications networks. In LTE cellular communications networks, handover (i.e., mobility) of mobile terminals between cells is controlled based on, at least in part, Reference Signal Received Power (RSRP) measurements made by the mobile terminals. A mobile terminal obtains an RSRP measurement for a cell using known reference signals transmitted in the downlink channel of the cell. However, inter-cell interference can significantly degrade the accuracy of the RSRP measurement. Using conventional RSRP measurement techniques, the number of time-frequency samples that must be used for the RSRP measurement in order to satisfy accuracy requirements in the presence of inter-cell interference becomes large, which in turn increases power consumption of the mobile terminal. As such, there is a need for systems and methods for efficiently providing highly accurate RSRP measurements in the presence of strong inter-cell interference.

SUMMARY

Systems and methods are disclosed for measuring received signal power at a mobile terminal in a cellular communications network in such a manner as to efficiently provide highly accurate received signal power measurements in the presence of strong inter-cell interference. In one embodiment, in order to measure received signal power for a measured cell, a mobile terminal selects weighting parameters for a number of time-frequency samples of a reference signal of the measured cell based, at least in part, on inter-cell interference from one or more synchronized interfering cells having reference signals that are synchronized to the reference signal of the measured cell and inter-cell interference from one or more non-synchronized interfering cells having reference signals that are non synchronized to the reference signal of the measured cell. In one embodiment, each weighting parameter is a weighting parameter for a different one of the time-frequency samples of the reference signal of the measured cell. In one embodiment, the weighting parameters are selected such that a combined impact of the inter-cell interference from the one or more synchronized interfering cells and noise that includes the inter-cell interference from the one or more non-synchronized interfering cells plus thermal noise is substantially reduced or minimized. The mobile terminal applies the time-frequency samples of the reference signal of the measured cell and the corresponding weighting parameters to corresponding time-frequency samples of a received signal from the measured cell in order to obtain a measurement of the received power for the measured cell. In one embodiment, the mobile terminal reports the received signal power measurement to the cellular communications network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for measuring received signal power at a mobile terminal in a cellular communications network in such a manner as to efficiently provide highly accurate received signal power measurements in the presence of strong inter-cell interference. Notably, much of the discussion herein focuses on Reference Signal Received Power (RSRP) measurements in a Long Term Evolution (LTE) cellular communications network. However, the concepts disclosed herein are not limited to RSRP measurements or LTE cellular communications networks. Rather, the concepts disclosed herein may be used to provide received signal power measurements based on other types of reference signals and in other types of cellular communication networks.

Figure 1:
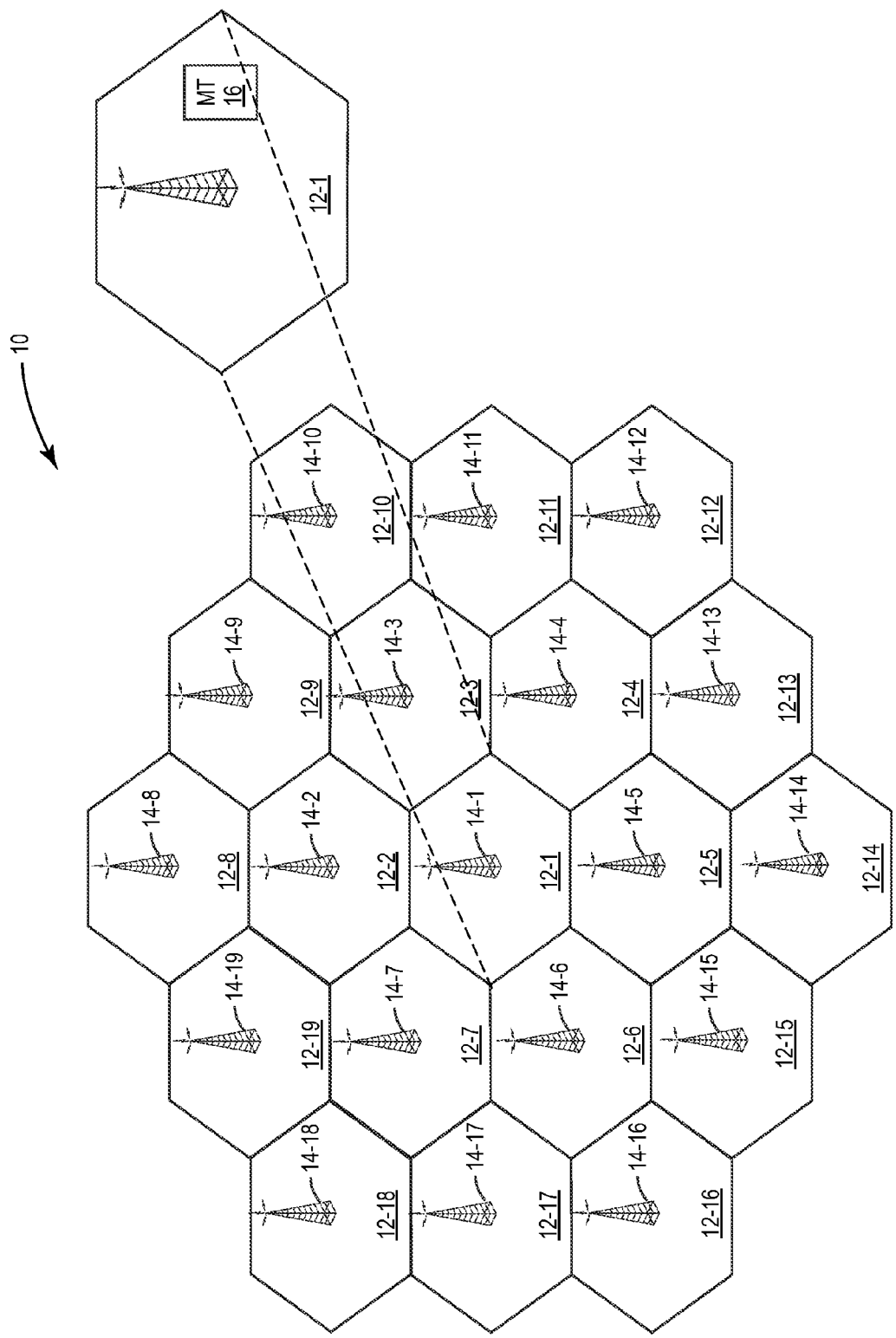
FIG. 1 illustrates a cellular communication network in which a mobile terminal measures received signal power according to one embodiment of the present disclosure.

FIG. 1 illustrates a cellular communications network 10 in which highly accurate received signal power measurements are made efficiently in the presence of inter-cell interference according to one embodiment of the present disclosure. In this embodiment, the cellular communications network 10 is a LTE cellular communications network. However, as noted above, the present disclosure is not limited thereto. The cellular communications network 10 includes a number of cells 12-1 through 12-19, which are generally referred to herein collectively as cells 12 and individually as cell 12. Notably, while nineteen cells 12 are illustrated in FIG. 1 for clarity and ease of discussion, it will be readily appreciated by one of ordinary skill in the art that the cellular communications network 10 may include any number of cells 12 and, in most implementations, will include a relatively large number of cells 12.

In this embodiment, the cells 12-1 through 12-19 are served by corresponding base stations 14-1 through 14-19, which are generally referred to herein collectively as base stations 14 and individually as base station 14. For LTE, the base stations 14 are typically enhanced Node Bs (eNBs) but may also include low power base stations (e.g., home eNBs or femto base stations). Further, while in this embodiment each of the base stations 14 serves only one cell 12, one or more of the base stations 14 may alternatively serve multiple cells 12. For instance, in LTE, an eNB may serve multiple cells, or sectors. The base stations 14 provide cellular communications services (e.g., voice and data services) to mobile terminals (MTs), such as the mobile terminal 16 located in the cell 12-1. While only one mobile terminal 16 is illustrated in FIG. 1, it will be readily appreciated by one of ordinary skill in the art that the cellular communications network 10 will typically serve hundreds, thousands, or even millions of mobile terminals.

As discussed below in detail, for mobility purposes (e.g., handover), the mobile terminals measure RSRP from nearby cells. For instance, the mobile terminal 16 may measure RSRP from the cell 12-1 as well as one or more of the cells 12-2 through 12-7 that neighbor the cell 12-1 in the cellular communications network 10. Notably, the cells 12-2 through 12-7 are also referred to herein as neighboring cells of the cell 12-1. The cellular communications network 10 (e.g., a Mobility Management Entity (MME) of the cellular communications network 10) may then decide when to perform handovers for the mobile terminal 16 based on the RSRP measurements made by the mobile terminal 16. The present disclosure provides systems and methods for obtaining highly accurate RSRP measurements in the presence of inter-cell interference without requiring a large number of time-frequency samples.

Figure 2:
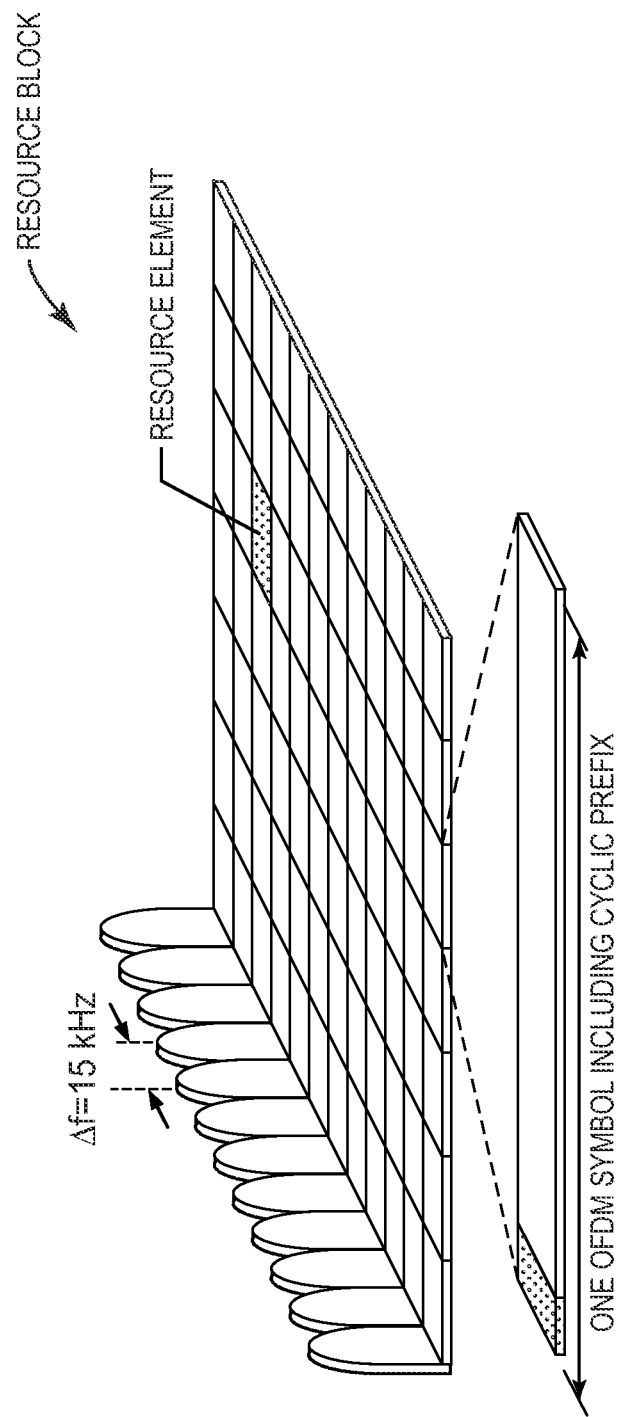
FIG. 2 illustrates a resource block of an Orthogonal Frequency Divisional Multiplexing (OFDM) signal in a Long Term Evolution (LTE) downlink channel.

Before specifically discussing the manner in which highly accurate RSRP measurements are made in the presence of inter-cell interference, a discussion of the downlink channel of the cellular communications network 10 is beneficial. Again, for this discussion, the cellular communications network 10 is an LTE network. For LTE, downlink transmissions from the base stations 14 to the mobile terminals are sent using Orthogonal Frequency Division Multiplexing (OFDM). In OFDM, a downlink carrier signal is split into multiple parallel subcarriers in frequency. The basic unit of transmission in LTE is a Resource Block (RB), which in its most common configuration consists of 12 subcarriers and 7 OFDM symbols as illustrated in FIG. 2. A unit of 1 subcarrier and 1 OFDM symbol is referred to as a Resource Element (RE), which is also illustrated in FIG. 2. Thus, in the most common configuration, a RB consists of 84 REs.

Figure 3:
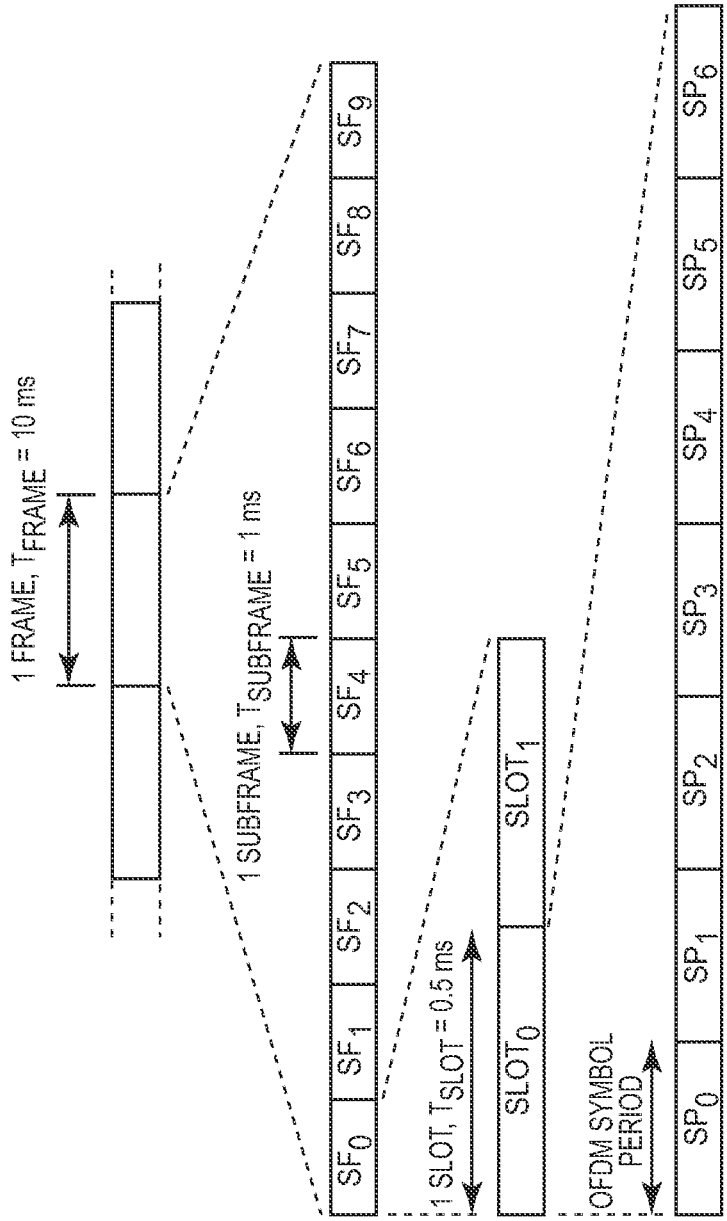
FIG. 3 illustrates a frame structure of a LTE downlink channel.

As illustrated in FIG. 3, in the time domain, the downlink carrier signal is organized into 10 milliseconds (ms) radio frames. Each radio frame consists of ten subframes, each having a duration of 1 ms. The subframes within a frame are referred to herein as subframes 0 through 9 ($SF_0$-$SF_9$). Further, for normal downlink subframes, each subframe consists of two slots, where each slot has a duration of 0.5 ms and consists of seven OFDM symbol periods. The two slots within a subframe are referred to herein as slots 0 and 1 ($SLOT_0$, $SLOT_1$), and the seven OFDM symbol periods within a slot are referred to herein as OFDM symbol periods 0 through 6 ($SP_0$-$SP_6$).

Figure 4:
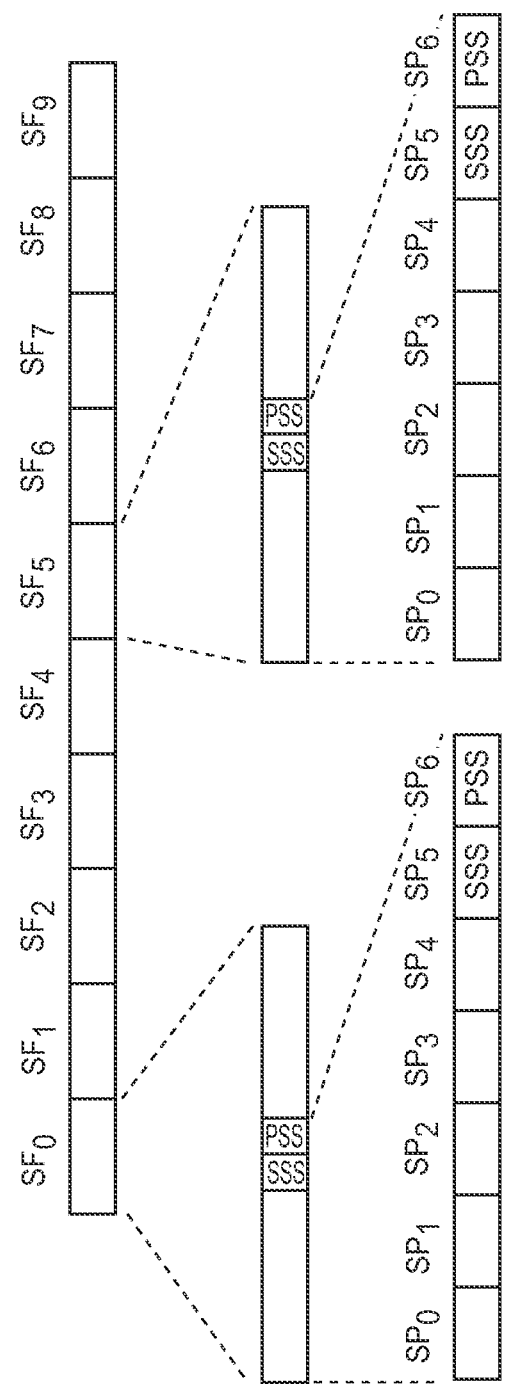
FIG. 4 illustrates locations of a Primary Synchronization Signal (PSS) and a Secondary Synchronization Signal (SSS) in the LTE downlink channel.

To assist in cell search and time and frequency synchronization, the downlink carrier signal carries, or includes, a Primary Synchronization Signal (PSS) and a Secondary Synchronization Signal (SSS). As illustrated in FIG. 4, for Frequency Division Duplexing (FDD) operation, the PSS is carried within the last OFDM symbol period of the first slot (i.e., slot 0) of subframes 0 and 5 in the center 73 subcarriers (i.e., the 6 center RBs) of the downlink carrier signal, and the SSS is carried within the second-to-last OFDM symbol period of the same subframes in the center 62 subcarriers (i.e., the 6 center RBs not including the DC subcarrier). Notably, while not necessary for understanding the present disclosure, the locations of the PSS and SSS are different for Time Division Duplexing (TDD) operation. For each of the cells 12, values or sequences for the PSS and SSS depend on a physical-layer cell identifier (ID) of the cell 12.

Figure 5:
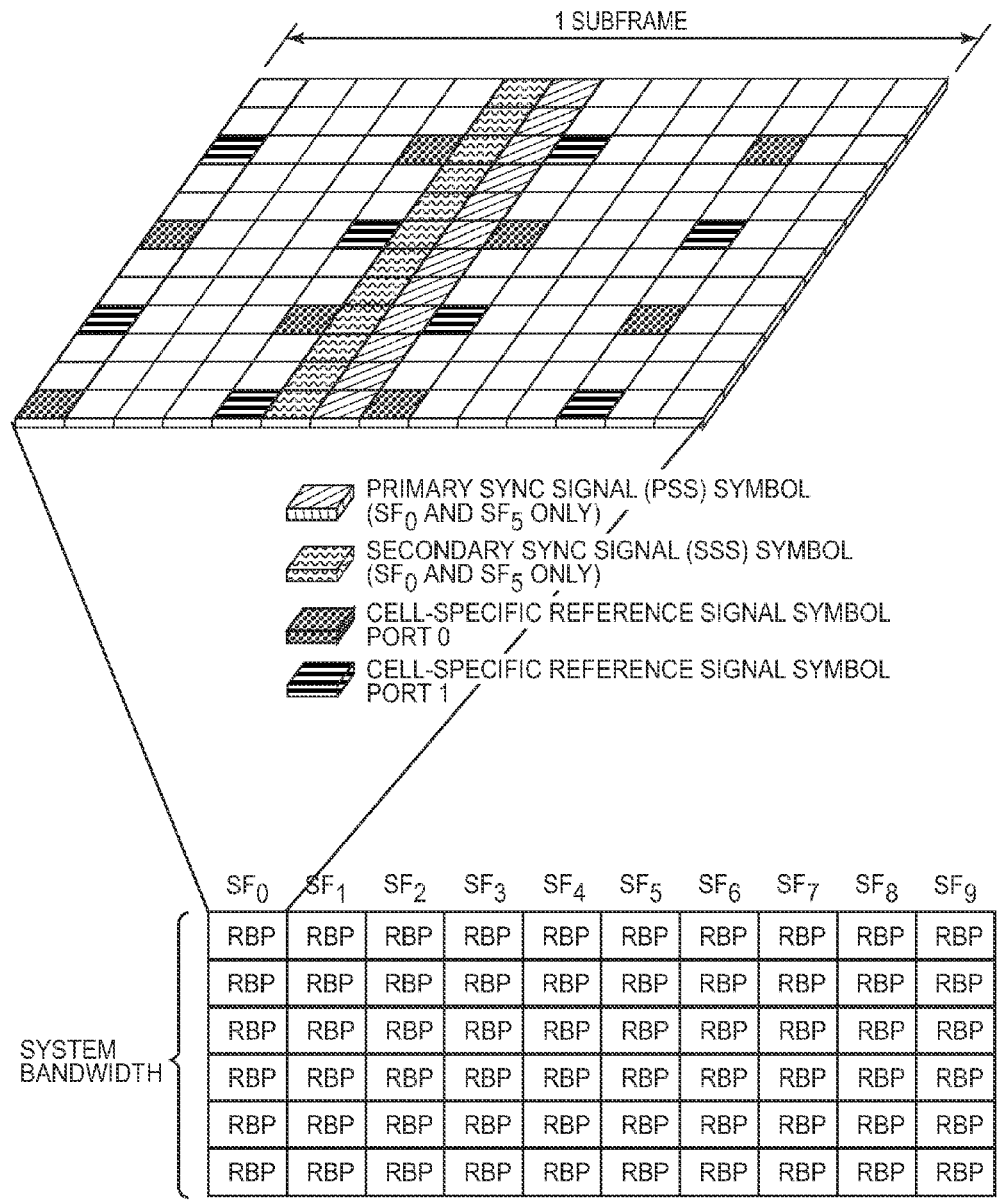
FIG. 5 illustrates a LTE subframe.

As illustrated in FIG. 5, each subframe includes a number of resource block pairs (RBPs or RB pairs) in the frequency domain. A RB pair consists of the two RBs in the two slots of a subframe. The number of RBs, or RB pairs, in the frequency domain of the downlink carrier signal determines a system bandwidth of the downlink carrier. Currently, system bandwidths supported by LTE correspond to the use of 6, 15, 25, 50, 75, or 100 RBs in the frequency domain for the bandwidths of 1.4, 3, 5, 10, 15, and 20 Megahertz (MHz), respectively. In the example of FIG. 5, there are 6 RB pairs in the frequency domain.

As discussed above, to assist in cell search and time and frequency synchronization, the PSS and SSS are carried in the last and second-to-last OFDM symbol periods of the first slot of subframes 0 and 5. In addition, one or more Cell-Specific Reference Signals (CRSs) are typically transmitted in every subframe and in every resource block in the frequency domain. The CRS(s) is utilized by the mobile terminals to, for example, estimate the downlink channel, acquire Channel State Information (CSI), measure RSRP, or the like. Currently, in LTE, the downlink carrier signal from any one of the cells 12 carries one, two, or four CRSs in corresponding "CRS ports". As illustrated in FIG. 5, CRS symbols for the CRS signal for port 0 are inserted within the first and third-from-last OFDM symbol period of each slot and with a frequency domain spacing of six subcarriers. Furthermore, there is a frequency domain staggering of three subcarriers for the CRS symbols within the third-from-last OFDM symbol period. Likewise, CRS symbols for the CRS signal for port 1 are inserted within the first and third-from-last OFDM symbol period of each slot and with a frequency domain spacing of six subcarriers. Furthermore, there is a frequency domain staggering of three subcarriers for the CRS symbols within the third-from-last OFDM symbol period. Thus, within each RB pair, there are eight CRS symbols for each utilized CRS port.

Both the values of the CRS symbols (i.e., the CRS sequences) and the locations of the CRS symbols in the downlink carrier signal depend on the cell ID of the corresponding cell 12. More specifically, in LTE, there are 504 different cell IDs each having a different, predefined sequence of CRS symbols. Further, a frequency shift of the CRS symbols illustrated in FIG. 5 also depends on the cell ID. In FIG. 5, the frequency shift of the CRS symbols is only one of six possible frequency-shifts defined in LTE. There are 84 different cell IDs assigned to each of the possible frequency-shifts. As discussed below, the mobile terminal 16 performs a cell search process during which the cell ID of the cell 12-1 is determined. From the cell ID of the cell 12-1, the mobile terminal 16 knows both the values of the CRS symbols (i.e., the CRS sequence) and the locations of the CRS symbols in the downlink carrier signal for the cell 12-1.

Against this backdrop, conventional RSRP measurements can be described as follows. A conventional RSRP measurement can be defined as a linear averaging of power contributions of time-frequency samples of a reference signal. Here, the reference signal refers to any downlink signal known to the mobile terminal such as, for example, CRS or SSS. The conventional RSRP measurement is typically characterized by the averaging of channel estimates on the time-frequency samples of the reference signal and consists of coherent averaging and non-coherent averaging. The coherent averaging is an averaging of the channel estimates over a coherent time and frequency window, which in a typical embodiment is set to one RB pair (i.e 12 sub carriers×2 slots (1 ms)). The non-coherent averaging is an averaging of the power estimates (i.e., the mean square estimates) over an entire measurement time and frequency window, which is typically 6 RBs in frequency and five to ten 1 or 2 ms samples per 200 ms.

In detail, using the mobile terminal 16 as an example, the mobile terminal 16 would conventionally measure RSRP for a desired cell (e.g., the cell 12-1 or one of the neighboring cells 12-2 through 12-7 of the cell 12-1) as follows. The cell 12 for which the mobile terminal 16 measures RSRP is referred to therein as the "measured cell," The inventors have found that the received signal $Y_{n,k}$ from the measured cell at the n-th coherent time-frequency window and the k-th time-frequency sample within the coherent time-frequency window can be expressed as:

$$\begin{pmatrix} Y_{n,1} \\ Y_{n,2} \\ \vdots \\ Y_{n,K} \end{pmatrix} = H_n \begin{pmatrix} X_{n,1} \\ X_{n,2} \\ \vdots \\ X_{n,K} \end{pmatrix} + H_n' \begin{pmatrix} X_{n,1}' \\ X_{n,2}' \\ \vdots \\ X_{n,K}' \end{pmatrix} + \begin{pmatrix} W_{n,1} \\ W_{n,2} \\ \vdots \\ W_{n,K} \end{pmatrix} \quad (1)$$

where $X_{n,k}$ for all values of n and k is the reference signal from the measured cell (i.e., the SSS or CRS from the measured cell), $H_n$ defines the downlink channel from the measured cell, $X_{n,k}'$ is the reference signal from a synchronized interfering cell, $H_n'$ defines the downlink channel from the synchronized interfering cell, and $W_{n,k}$ is an Additive White Gaussian Noise (AWGN) given by $N(0, \delta_W)$. Each individual value of $Y_{n,k}$ (i.e., $Y_{n,k}$ for each particular value of n and k) is referred to herein as a time-frequency sample of the received signal. Likewise, each individual value of $X_{n,k}$ (i.e., $X_{n,k}$ for each particular value of n and k) is referred to herein as a time-frequency sample of the reference signal of the measured cell, and each individual value of $X_{n,k}'$ (i.e., $X_{n,k}'$ for each particular value of n and k) is referred to herein as a time-frequency sample of the reference signal of the synchronized interfering cell. Note that, for clarity and ease of discussion, the equations presented herein (including Equation (1)) assume that there is only one synchronized interfering cell. However, the present disclosure is equally applicable for embodiments where there is more than one synchronized interfering cell.

The synchronized interfering cell is one of the cells 12 other than the measured cell having a reference signal ($X_{n,k}'$) that is synchronized to the reference signal ($X_{n,k}$) of the measured cell that is to be used for the RSRP measurement. As used herein, the two reference signals are synchronized when the symbols of the reference signals are time and frequency aligned (i.e., the two reference signals are carried in the same time and frequency resources or REs). Again, note that while Equation (1) provides for only one synchronized interfering cell, there may be more than one synchronized interfering cell. Further, the AWGN corresponds to inter-cell interference from one or more non-synchronized interfering cells, since interference from the non-synchronized cell(s) typically comes from a data part of the interfering signal, plus thermal noise. As used herein, a non-synchronized interfering cell is one of the cells 12 other than the measured cell that has a reference signal that is not synchronized to the reference signal of the measured cell to be used for the RSRP measurement.

It is assumed that the channel $H_n$ and the channel $H_n'$ remain the same inside the coherent time-frequency window, which are reasonable assumptions for typical LTE mobility scenarios, assuming coherent averaging over one RB pair. As a result, it is possible to rewrite Equation (1) as:

$$Y_{n,k} = H_n X_{n,k} + H_n' X_{n,k}' + W_{n,k}, n=1, \ldots, N, k=1, \ldots, K. \quad (2)$$

Assuming that there are N coherent time-frequency windows and K time-frequency samples within each coherent time-frequency window, the coherent averaging and non-coherent averaging (i.e., the RSRP measurement (RSRP)) can be expressed as:

$$RSRP = \frac{1}{N} \sum_{n=1}^{N} \left| \frac{1}{K} \sum_{k=1}^{K} \frac{Y_{n,k}}{X_{n,k}} \right|^2. \quad (3)$$

From Equations (2) and (3), the inventors have found that the conventional RSRP measurement experiences degradation due to inter-cell interference. More specifically, by substituting Equation (2) into Equation (3), the conventional RSRP measurement can be defined as:

$$RSRP = \frac{1}{N} \sum_{n=1}^{N} \left| H_n + H_n' \frac{1}{K} \sum_{k=1}^{K} \frac{X_{n,k}'}{X_{n,k}} + \frac{1}{K} \sum_{k=1}^{K} \frac{W_{n,k}}{X_{n,k}} \right|^2. \quad (4)$$

In Equation (4), the first term inside the summation, $H_n$, is the desired portion of the RSRP measurement, and the latter two terms inside the summation constitute inter-cell interference that degrades the accuracy of the RSRP measurement. The impact of inter-cell interference from the synchronized interfering cell (i.e., the second term within the summation in Equation (4)) on the accuracy of the RSRP measurement depends on the reference signals of the two cells (i.e., the measured cell and the synchronized interfering cell) and, more specifically, depends on:

$$\frac{1}{K}\sum_{k=1}^{K}\frac{X'_{n,k}}{X_{n,k}}, \quad (4a)$$

which is the cross-correlation of the reference signals of the two cells when the reference signals are designed to have a constant (unit) amplitude. The latter restriction makes Equation (4a) equivalent to:

$$\frac{1}{K}\sum_{k=1}^{K}X'_{n,k}X^*_{n,k}, \quad (4b)$$

which is in the form of a traditional correlation function.

Since the accuracy of the conventional RSRP measurement is subject to the cross-correlation of the reference signals of the measure cell and the synchronized interfering cell(s) within the coherent time-frequency window, it would be desirable to design the reference signals such that the cross-correlation is kept low. However, for a given LTE standard, the reference signals (sequences) are defined and not possible to change. Furthermore, the cross-correlation may vary with the coherent time-frequency window. In other words, some coherent time-frequency windows may have a higher cross-correlation than other coherent time-frequency windows. More importantly, as a new release of LTE introduces a less dense reference signal (e.g., reduced CRS for the new carrier type in Rel-11), the cross-correlation variation may become more pronounced. In addition, a substantial portion of some reference signals may use the same sequence. For example, PSS from two cells may be based on exactly the same sequence, whereas half of the SSS from two cells may be based on the same sequence. Obviously, this leads to an extremely high cross-correlation between two reference signals and significantly degrades the accuracy of the RSRP measurement.

Figure 6:
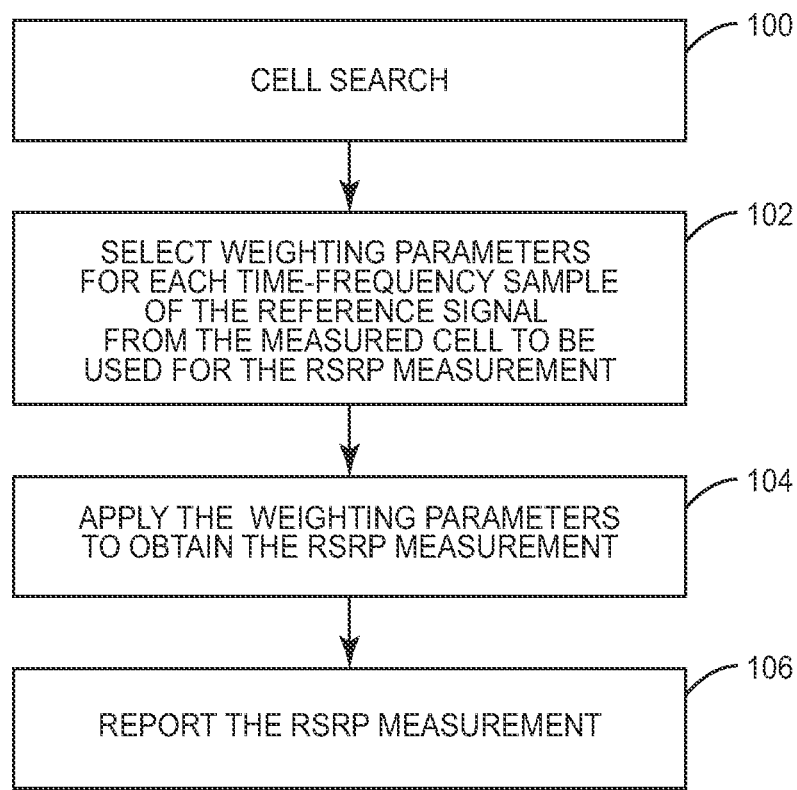
FIG. 6 illustrates processes for measuring Reference Signal Received Power (RSRP) at a mobile terminal utilizing weighting parameters that mitigate an impact of inter-cell interference according to one embodiment of the present disclosure.

In order to address the issues discussed above, systems and methods for measuring RSRP efficiently and with high accuracy in the presence of the aforementioned inter-cell interference are disclosed herein. In this regard, FIG. 6 illustrates a process for efficiently obtaining highly accurate RSRP measurements in the presence of inter-cell interference according to one embodiment of the present disclosure. First, the mobile terminal 16 performs a cell search (step 100). During the cell search, the mobile terminal 16 detects and identifies one or more cells, which in this example include the cell 12-1 and one or more of the neighboring cells 12-2 through 12-7 of the cell 12-1.

In order to detect and identify a cell 12 during the cell search, the mobile terminal 16 first detects and identifies the PSS of the cell 12. Once the mobile terminal 16 has detected and identified the PSS of the cell 12, the mobile terminal 16 has determined the five-millisecond timing of the cell 12, the location of the SSS since the SSS has a known, fixed offset with respect to the PSS, and a relative cell ID of the cell 12 within a cell ID group of the cell 12. As discussed above, in LTE there are 504 possible cell IDs divided into 168 cell ID groups, where each cell ID group includes three different cell IDs. Further, there are three possible PSSs where each PSS is assigned to one cell ID within each cell ID group. Thus, by detecting and identifying the PSS, the mobile terminal 16 knows the relative cell ID within a cell ID group, but does not yet know the cell ID group and therefore does not yet know the cell ID (i.e., the absolute cell ID) of the cell 12.

After detecting and identifying the PSS of the cell 12, the mobile terminal 16 detects and identifies the SSS of the cell 12. Once the SSS of the cell 12 is detected and identified, the mobile terminal 16 knows the frame timing of the cell 12 and the cell ID group of the cell 12. More specifically, each cell 12 uses two SSS sequences, namely a first SSS sequence for subframe 0 and a second SSS sequence for subframe 5. The two SSS sequences for a cell take their values from sets of 168 possible values corresponding to the 168 different cell ID groups. Thus, by detecting and identifying the SSS of the cell 12, the mobile terminal 16 knows the cell ID group for the cell 12. At that point, based on the relative cell ID within the cell ID group known from the PSS and the cell ID group known from the SSS, the mobile terminal 16 knows the cell ID of the cell 12.

Once the cell search is complete, the mobile terminal 16 has identified a number of the cells 12 that are within range of the mobile terminal 16. At this point, the mobile terminal 16 proceeds to obtain an RSRP measurement for one of the cells 12 detected and identified during the cell search. The cell 12 for which the RSRP measurement is to be obtained is referred to herein as the measured cell. The other cells detected and identified during the cell search are referred to herein as interfering cells. The interfering cells include one or more synchronized interfering cells having reference signals that are synchronized to a reference signal of the measured cell that is to be used for the RSRP measurement, one or more non-synchronized interfering cells having reference signals that are not synchronized to the reference signal of the measured cell, or both. Again, note that the inter-cell interference from the one or more non-synchronized cells plus thermal noise are represented as AWGN.

In order to obtain the RSRP measurement for the measured cell, the mobile terminal 16 first selects weighting parameters for time-frequency samples of the reference signal of the measured cell that is to be used for the RSRP measurement (step 102). The weighting parameters include a weighting parameter for each time-frequency sample of the reference signal of the measured cell to be used for the RSRP measurement. As discussed below, applying the weighting parameters is equivalent to (de)scrambling the reference signal of the measured cell with a new sequence, i.e., the sequence given by the weighting parameters. While numerous embodiments of a process for selecting the weighting parameters are described below, in general, the weighting parameters are selected such that a combined impact of inter-cell interference from one or more synchronized interfering cells and the AWGN (i.e., inter-cell interference from one or more non-synchronized interfering cells plus thermal noise) on the RSRP measurement is substantially reduced or minimized. Notably, if the reference signal is the CRS of the measured cell, the weighting parameters will vary over the respective RB pair, but since the CRS signature is 10 ms long, the weighting parameters may be repeated every 10 ms.

Next, the mobile terminal 16 applies the weighting parameters to obtain an RSRP measurement for the measured cell (step 104). More specifically, the mobile terminal 16 applies the time-frequency samples of the reference signal of the measured cell and the corresponding weighting parameters to corresponding time-frequency samples of a received signal from the measured cell in order to obtain the RSRP measurement for the measured cell. In one particular embodiment, the RSRP measurement is calculated using the weighting parameters as according to the equation:

$$RSRP = \frac{1}{N}\sum_{n=1}^{N}\left|\frac{1}{K}\sum_{k=1}^{K}A_{n,k}\frac{Y_{n,k}}{X_{n,k}}\right|^2 \quad (5)$$

where $A_{n,k}$ is the weighting parameter at the n-th coherent time-frequency window and the k-th time-frequency sample within the n-th coherent time-frequency window. This is equivalent to (de)scrambling the reference signal $X_{n,k}$ with a new sequence $A_{n,k}$; in other words, replacing the reference signal $X_{n,k}$ by a new reference signal $X_{n,k}/A_{n,k}$. Thus, it is possible to rewrite Equation (4) as $$RSRP = \quad (6)$$

$$\frac{1}{N}\sum_{n=1}^{N}\left|H_n\frac{1}{K}\sum_{k=1}^{K}A_{n,k} + H'_n\frac{1}{K}\sum_{k=1}^{K}\frac{X'_{n,k}}{X_{n,k}/A_{n,k}} + \frac{1}{K}\sum_{k=1}^{K}\frac{W_{n,k}}{X_{n,k}/A_{n,k}}\right|^2.$$

In one embodiment, the weighting parameters $A_{n,k}$ are normalized such that $$\sum_{k=1}^{K}A_{n,k} = K. \quad (7)$$

Note that the conventional method in Equation (3) corresponds to a special case where $A_{n,k}=1$.

In this embodiment, once the RSRP measurement for the measured cell is obtained, the mobile terminal 16 reports the RSRP measurement to the cellular communications network 10 (step 106). The cellular communications network 10 may then utilize the RSRP measurement for mobility purposes (e.g., to determine whether to perform a handover of the mobile terminal 16 from one cell 12 to another cell 12). While not illustrated, it should be noted that steps 102 through 106 may be repeated to obtain RSRP measurements for each of the cells 12 detected and identified in the cell search of step 100. Further, the entire process of FIG. 6 is preferably repeated such that the cells 12 detected by the cell search, the weighting parameters, and the RSRP measurements are updated as the mobile terminal 16 moves throughout the cellular communications network 10.

Figure 7:
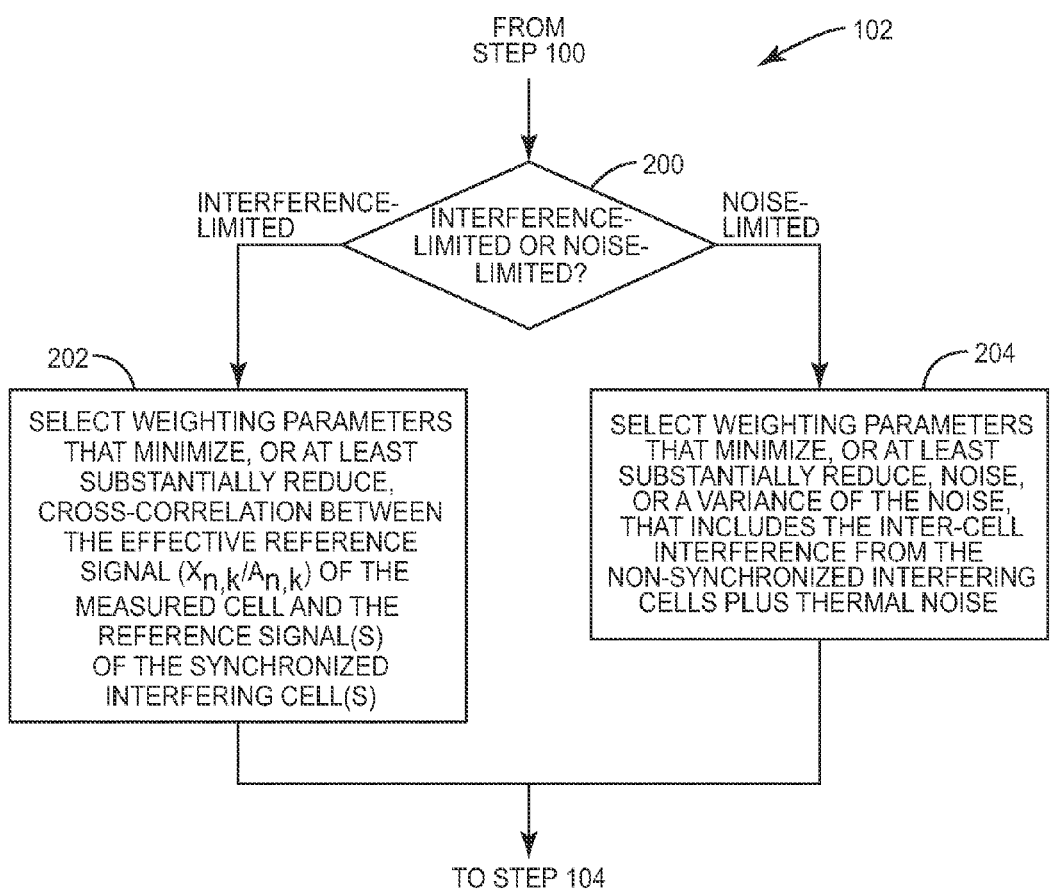
FIG. 7 illustrates a process for selecting the weighting parameters of FIG. 6 according to one embodiment of the present disclosure.

FIG. 7 illustrates step 102 of FIG. 6 in more detail according to one embodiment of the present disclosure. As illustrated, in this embodiment, the mobile terminal 16 first determines whether the mobile terminal 16 is experiencing an interference-limited scenario or a noise-limited scenario (step 200). As used herein, an interference-limited scenario is where the inter-cell interference from the synchronized interfering cells impacts the RSRP measurement more than the AWGN (i.e., the inter-cell interference from the non-synchronized interfering cells plus thermal noise). Stated differently, an interference-limited scenario is where the inter-cell interference from the synchronized interfering cells is greater than the inter-cell interference from the non-synchronized interfering cells plus the thermal noise. The interference-limited scenario may be represented as the scenario where the term $$H'_n\frac{1}{K}\sum_{k=1}^{K}\frac{X'_{n,k}}{X_{n,k}/A_{n,k}}$$

from Equation (6), which is the term for the inter-cell interference from the synchronized interfering cells, is greater than the term $$\frac{1}{K}\sum_{k=1}^{K}\frac{W_{n,k}}{X_{n,k}/A_{n,k}}$$

from Equation (6), which is the AWGN term that includes the inter-cell interference from the non-synchronized interfering cells plus thermal noise. Similarly, as used herein, a noise-limited scenario is where the inter-cell interference from the AWGN (i.e., the inter-cell interference from the non-synchronized interfering cells plus the thermal noise) impacts the RSRP measurement more than the inter-cell interference from the synchronized interfering cells. Stated differently, a noise-limited scenario is where the inter-cell interference from the non-synchronized interfering cells plus thermal noise is greater than the inter-cell interference from the synchronized interfering cells. The noise-limited scenario may be represented as the scenario where the term $$\frac{1}{K}\sum_{k=1}^{K}\frac{W_{n,k}}{X_{n,k}/A_{n,k}}$$

from Equation (6), which is the AWGN term that includes the inter-cell interference from the non-synchronized interfering cells plus thermal noise, is greater than the term $$H'_n\frac{1}{K}\sum_{k=1}^{K}\frac{X'_{n,k}}{X_{n,k}/A_{n,k}}$$

from Equation (6), which is the term for the inter-cell interference from the synchronized interfering cells.

The manner in which the mobile terminal 16 determines whether the mobile terminal 16 is experiencing an interference-limited scenario or a noise-limited scenario may vary depending on the particular implementation. As such, the present disclosure should not be limited to any particular methodology for determining whether the mobile terminal 16 is experiencing an interference-limited scenario or a noise-limited scenario. However, as one example, the mobile terminal 16 may obtain conventional RSRP measurements for both the synchronized interfering cell(s) and the non-synchronized interfering cell(s). If the RSRP measurement for the synchronized interfering cell (or sum of the RSRP measurements if there are multiple synchronized interfering cells) is greater than the RSRP measurement for the non-synchronized interfering cell (or sum of the RSRP measurements if there are multiple synchronized interfering cells) plus a measurement for the thermal noise, then the mobile terminal 16 determines that the mobile terminal 16 is experiencing an interference-limited scenario. Otherwise, the mobile terminal 16 determines that the mobile terminal 16 is experiencing a noise-limited scenario.

If the mobile terminal 16 is experiencing an interference-limited scenario, the mobile terminal 16 selects weighting parameters that minimize, or at least substantially reduce, cross-correlation between $X_{n,k}/A_{n,k}$ and the reference signal(s) of the synchronized interfering cell(s) (step 202). $X_{n,k}/A_{n,k}$ is referred to herein as an effective reference signal of the measured cell after application of the weighting parameters. More specifically, in one particular embodiment, the weighting parameters are selected to minimize the synchronized inter-cell interference term:

$$\frac{1}{K}\sum_{k=1}^{K}\frac{X'_{n,k}}{X_{n,k}/A_{n,k}}.$$

In one embodiment, the mobile terminal 16 selects the weighting parameters from a Look Up Table (LUT) based on the cell ID of the measured cell and the cell ID(s) of the synchronized interfering cell(s), where the LUT stores, for each possible combination of cell IDs, a corresponding set of weighting parameters that minimize the synchronized inter-cell interference term given above. In another embodiment, the mobile terminal 16 calculates the weighting parameters based on the cell IDs of the measured cell and the synchronized interfering cell(s) or more specifically based on the reference signals defined for the cell IDs of the measured cell and the synchronized interfering cell(s).

In another embodiment, the weighting parameters are decreased with increasing cross-correlation between the reference signal of the measured cell and the reference signal(s) of the synchronized interfering cell(s). In other words, the weighting parameters for a coherent time-frequency window with a higher cross-correlation are smaller than the weighting parameters for a coherent time-frequency window with lower cross-correlation. Thus, it is possible to weight relatively reliable coherent time-frequency windows over unreliable coherent time-frequency windows during non-coherent averaging and thereby improve the accuracy of the RSRP measurement. In one particular embodiment, the weighting parameter $A_{n,k}$ is assigned to each coherent time-frequency window in inverse proportion to the absolute value of the cross-correlation $$\frac{1}{K}\sum_{k=1}^{K}\frac{X'_{n,k}}{X_{n,k}}.$$

One of ordinary skill in the art will readily appreciate that there are numerous ways in which the weighting parameter $A_{n,k}$ can be decreased with increasing cross-correlation. For example, the weighting parameter $A_{n,k}$ may alternatively be inversely proportional to the absolute value of $$\left(\frac{1}{K}\sum_{k=1}^{K}\frac{X'_{n,k}}{X_{n,k}}\right)^2,$$

for the interference-limited scenario. As discussed above, in one embodiment, the mobile terminal 16 selects the weighting parameters from a LUT based on the cell ID of the measured cell and the cell ID(s) of the synchronized interfering cell(s), where the LUT stores, for each possible combination of cell IDs, a corresponding set of weighting parameters that reduce the weighting parameters with increasing cross-correlation in the manner described above. In another embodiment, the mobile terminal 16 calculates the weighting parameters based on the cell IDs of the measured cell and the synchronized interfering cell(s) or more specifically based on the reference signals defined for the cells IDs of the measured cell and the synchronized interfering cell(s).

In another embodiment, the weighting parameters are selected such that, in effect, a few reliable windows are selected for the RSRP measurement based on the cross-correlation. This may be expressed as:

$$A_{n,k}=\begin{cases}A, & \dfrac{1}{K}\sum_{k=1}^{K}\dfrac{X'_{n,k}}{X_{n,k}}\leq\lambda\\ 0, & \dfrac{1}{K}\sum_{k=1}^{K}\dfrac{X'_{n,k}}{X_{n,k}}>\lambda,\end{cases}$$

where A is some predetermined weighting value that is greater than zero (e.g., 1 or 2). Note that in this case, the weighting parameter is common to all the time-frequency samples within a window. Again, the weighting parameters may be selected from a LUT using the cell IDs of the measured cell and the synchronized interfering cell(s) or dynamically computed based on the cell IDs, or more specifically the reference signals defined for the cell IDs, of the measured cell and the synchronized interfering cell(s).

In yet another embodiment, the reference signals of the measured cell and the one or more synchronized interfering cells are the SSSs of those cells. Notably, in LTE, the SSS sequences for two cells carried on either odd subcarriers or even subcarriers may be the same. As such, in the interference-limited scenario, the mobile terminal 16 may determine whether the SSS sequence for the measured cell is the same as the SSS sequence for any of the one or more synchronized interfering cells on either even or odd subcarriers. If so, the mobile terminal 16 may select the weighting parameters to reduce or minimize the impact of the even or odd subcarriers where the SSS sequences are the same on the RSRP measurement. For example, if the SSS sequences are the same on the even subcarriers, the mobile terminal 16 may select the weighting parameters such that the weighting parameters are defined as:

$$A_{n,k}=\begin{cases}A, & k=2i\\ 0, & k=2i+1,\end{cases}$$

where A is some predetermined weighting value that is greater than zero (e.g., 2). Notably, in this embodiment, the weighting parameters are varied within a coherent time-frequency window.

Returning to step 200, if the mobile terminal 16 determines that the mobile terminal 16 is experiencing a noise-limited scenario, the mobile terminal 16 selects the weighting parameters that minimize, or at least substantially reduce, the AWGN that includes the inter-cell interference of the non-synchronized interfering cells plus the thermal noise (step 204). In one particular embodiment, the mobile terminal 16 selects the weighting parameters to minimize, or at least substantially reduce, the variance of the AWGN term from Equation (6), which is:

$$\frac{1}{K}\sum_{k=1}^{K}\frac{W_{n,k}}{X_{n,k}/A_{n,k}}.$$

Notably, the mean or variance of the AWGN term from Equation (6) can be expressed as:

$$E\left[\left|\frac{1}{K}\sum_{k=1}^{K}\frac{W_{n,k}}{X_{n,k}/A_{n,k}}\right|^2\right] = \frac{\delta_W^2}{K^2}\sum_{k=1}^{K}\left|\frac{A_{n,k}}{X_{n,k}}\right|^2 \quad (7)$$

$$= \frac{\delta_W^2}{K^2}\sum_{k=1}^{K}|A_{n,k}|^2 \geq \frac{\delta_W^2}{K^3}\left|\sum_{k=1}^{K}A_{n,k}\right|^2$$

$$= \frac{\delta_W^2}{K}.$$

Here it is assumed that the reference signal is designed to have unit amplitude, i.e., $|X_{n,k}|=1$. From Equation (7), it can be understood that the variance is minimized when $A_{n,k}=1$, which is the equivalent to the conventional RSRP measurement method expressed in Equation (3). The optimal weighting parameters do not always satisfy this condition, thereby failing to minimize the variance of the AWGN term. From step 202 or step 204, the process proceeds to step 104 (FIG. 6).

In the embodiments described above, the weighting parameters are selected differently depending on whether the mobile terminal 16 is experiencing an interference-limited scenario or a noise-limited scenario. However, the weighting parameters may alternatively be selected based on a trade-off, or an adaptation, between weighting parameters optimized for the interference-limited scenario and weighting parameters optimized for the noise-limited scenario. For instance, since the cell IDs, and therefore the reference signals, are known from the cell search, the mobile terminal 16 can adapt the weighting parameters based on the amount of inter-cell interference from the synchronous interfering cell(s) versus the amount of inter-cell interference from the non-synchronous interfering cell(s) plus the thermal noise.

Figure 8:
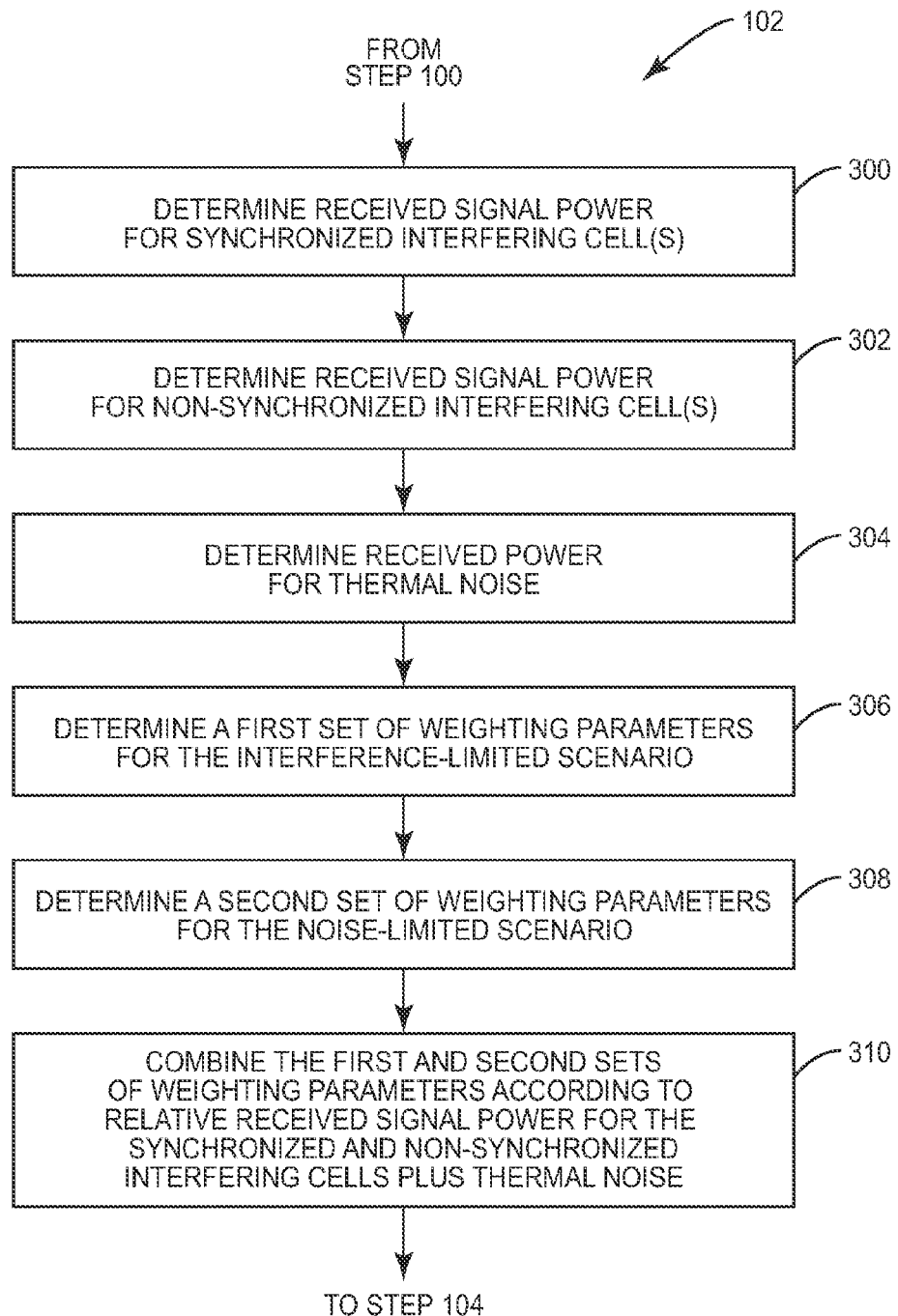
FIG. 8 illustrates a process for selecting the weighting parameters of FIG. 6 according to another embodiment of the present disclosure.

In this regard, FIG. 8 illustrates step 102 of FIG. 6 in more detail according to one embodiment of the present disclosure in which the mobile terminal 16 adapts the weighting parameters based on the amount of inter-cell interference from the synchronous interfering cell(s) versus the amount of inter-cell interference from the non-synchronous interfering cell(s) plus the thermal noise. Note, however, that this embodiment is only one example. One of ordinary skill in the art will readily appreciate other methodologies for adapting the weighting parameters based on the amount of inter-cell interference from the synchronous interfering cell(s) versus the amount of inter-cell interference from the non-synchronous interfering cell(s) plus the thermal noise, all of which are to be considered within the scope of the present disclosure.

As illustrated, in order to select the weighting parameters, the mobile terminal 16 first determines, or measures, received signal power for the synchronous interfering cell(s) (step 300). As an example, the mobile terminal 16 may obtain a conventional RSRP measurement(s) for the synchronous interfering cell(s). In a similar manner, the mobile terminal 16 determines, or measures, received signal power for the non-synchronous interfering cell(s) (step 302). Again, as an example, the mobile terminal 16 may obtain a conventional RSRP measurement(s) for the non-synchronous interfering cell(s). In addition, the mobile terminal 16 determines a received power for the thermal noise (step 304). The mobile terminal 16 may determine or measure the thermal noise using any suitable thermal noise determination or measurement technique.

The mobile terminal 16 determines a first set of weighting parameters for the interference-limited scenario in the manner described above (step 306). Likewise, the mobile terminal 16 determines a second set of weighting parameters for the noise-limited scenario in the manner described above (step 308). The mobile terminal 16 then combines the first and second sets of weighting parameters according to a relative received signal power for the synchronous and non-synchronous interfering cells plus the thermal noise to thereby provide the weighting parameters for the RSRP measurement (step 310). More specifically, in one particular embodiment, the mobile terminal 16 computes a weighted average of the first and second sets of weighting parameters where weights are assigned to the first and second sets of weighting parameters based on the relative received signal power for the synchronous and non-synchronous interfering cells plus the thermal noise. For example, the weight assigned to the first set of weighting parameters for the weighted average may be a ratio of the received signal power from the synchronized interfering cell(s) over the sum of the received signal power from the synchronized interfering cell(s), the received signal power from the non-synchronized interfering cell(s), and the received power for the thermal noise.

As an example, assume that the reference signal for the measured cell to be used to measure RSRP for the measured cell is the CRS from the measured cell and that three cells 12 (i.e., the measured cell and two interfering cells) have been detected and identified by the mobile terminal 16 during the cell search. The three cells are referred to in this example as cells A, B, and C, where cell A is the measured cell. From the cell IDs of cells A, B, and C, the CRS sequences as well as the REs used for CRSs can be determined for cells A, B, and C. Further assume that cell A and cell B have CRS on the same REs (i.e., cell B is a synchronized interfering cell), while cell C has CRS on a shifted RE position (i.e., cell C is a non-synchronized interfering cell). If the cells B and C are equally strong (e.g., the received signal power from cell B is equal to the received signal power from cell C), the mobile terminal 16 obtains the weighting parameters for the RSRP measurement for cell A by computing a weighted average of the first set of weighting parameters for the interference-limited scenario and the second set of weighted parameters for the noise-limited scenario, where a weight of 50% is applied to both the first and second sets of weighting parameters. In contrast, if, for example, cell B is 20% stronger than cell C (i.e., an interference-limited scenario), then the mobile terminal 16 obtains the weighting parameters for the RSRP measurement for cell A by computing a weighted average of the first set of weighting parameters for the interference-limited scenario and the second set of weighted parameters for the noise-limited scenario, where a weight of 60% is applied to the first set of weighting parameters and a weight of 40% is applied to the second set of weighting parameters.

Figure 9:
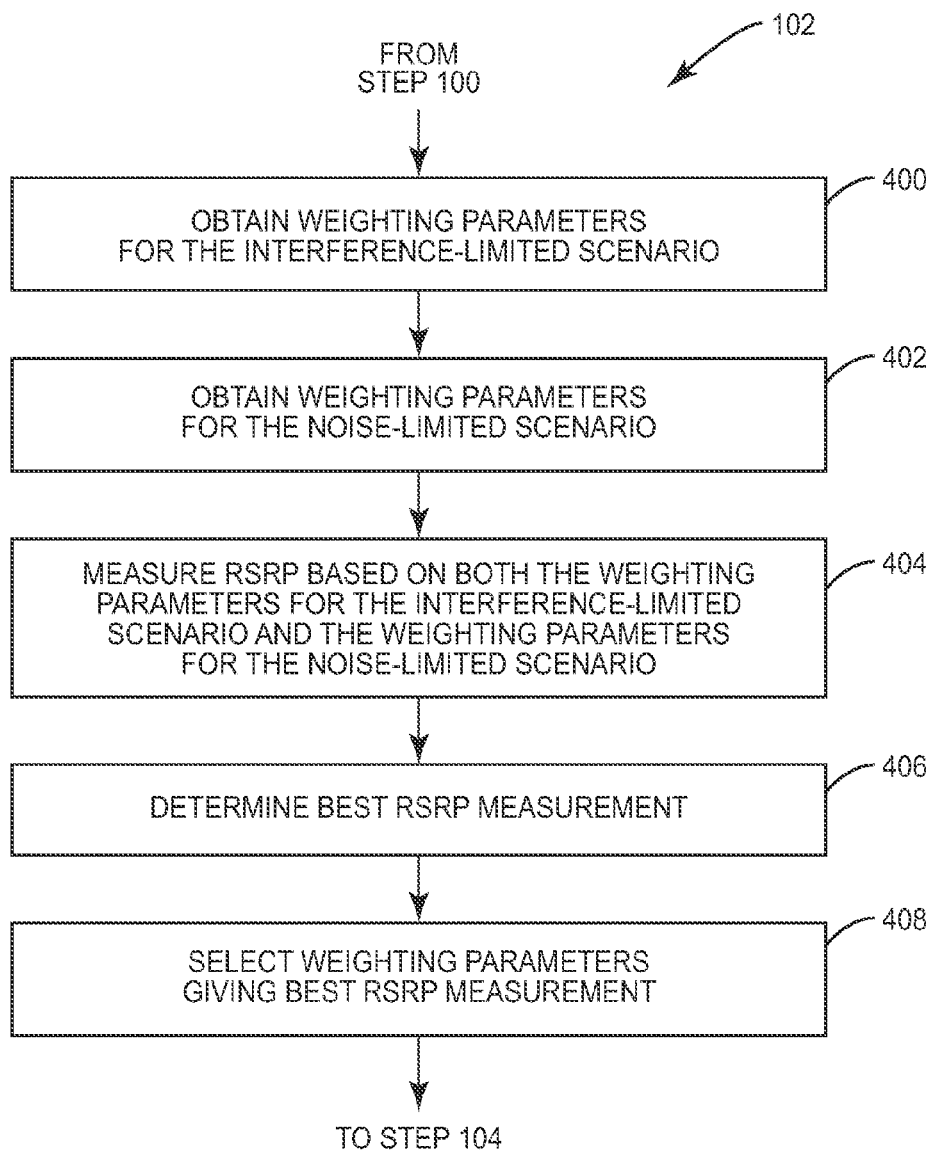
FIG. 9 illustrates a process for selecting the weighting parameters of FIG. 6 according to yet another embodiment of the present disclosure.

FIG. 9 illustrates step 102 of FIG. 6 in more detail according to another embodiment of the present disclosure in which the mobile terminal 16 adapts the weighting parameters based on the amount of inter-cell interference from the synchronous interfering cell(s) versus the amount of inter-cell interference from the non-synchronous interfering cell(s) plus the thermal noise. Again, this embodiment is only one example methodology for adapting the weighting parameters based on the amount of inter-cell interference from the synchronous interfering cell(s) versus the amount of inter-cell interference from the non-synchronous interfering cell(s) plus the thermal noise. As illustrated, the mobile terminal 16 obtains weighting parameters for the interference-limited scenario in the manner described above (step 400). Likewise, the mobile terminal 16 obtains weighting parameters for the noise-limited scenario in the manner described above (step 402).

The mobile terminal 16 measures RSRP for the measured cell using both the weighting parameters for the interference-limited scenario and the weighting parameters for the noise-limited scenario (step 404). The mobile terminal 16 then determines the best RSRP measurement from step 404 (i.e., the RSRP measurement that is most accurate or has the highest quality) (step 406). While the accuracy of the two RSRP measurements may be determined using any suitable technique, as one example, the accuracy of the RSRP measurements may be determined based on the RSRP measurements and a measurement of noise power. As another example, multiple RSRP measurements for each of the interference-limited and noise-limited scenarios and the accuracy of the measurements may be determined based on the variation of the RSRP measurements for the interference-limited scenario versus the variation of the RSRP measurements for the noise-limited scenario. Note that erroneous RSRP measurements will tend to vary with time more than non-erroneous measurements because of time-varying interference and noise.

The mobile terminal 16 selects the weighting parameters that provide the best, or most accurate, RSRP measurement as the weighting parameters to be used for the RSRP measurement for the measured cell (step 408). Notably, while in this embodiment, the process of FIG. 9 is a more detailed illustration of step 102 of FIG. 6, the process of FIG. 9 is not limited thereto. For instance, in another embodiment, the process of FIG. 9 may be utilized as both steps 102 and 104 of FIG. 6, wherein the best RSRP measurement determined in step 406 is reported to the cellular communications network 10. In this case, step 408 may not be needed.

Figure 10:
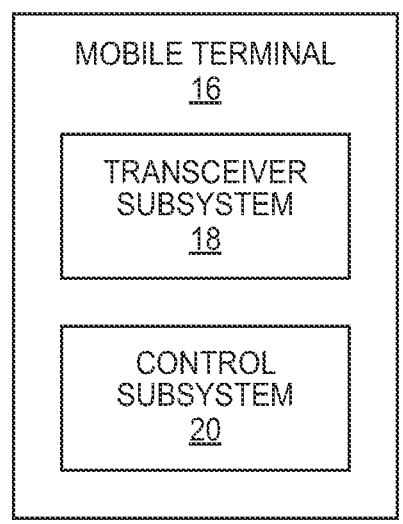
FIG. 10 is a block diagram of the mobile terminal of FIG. 1 according to one embodiment of the present disclosure.

FIG. 10 is a block diagram of the mobile terminal 16 according to one embodiment of the present disclosure. As illustrated, the mobile terminal 16 includes a transceiver subsystem 18 and a control subsystem 20. The transceiver subsystem 18 generally includes analog and, in some embodiments, digital components for sending and receiving signals to and from the cellular communications network 10 (i.e., sending and receiving signals to and from the base stations 14). From a wireless communications protocol view, the transceiver subsystem 18 implements at least part of Layer 1 (i.e., the Physical or "PHY" Layer). The control subsystem 20 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 18 and the control subsystem 20, will vary depending on both the particular implementation as well as the standard or standards supported by the mobile terminal 16.

Those skilled in the art will appreciate that the block diagram of the mobile terminal 16 illustrated in FIG. 10 necessarily omits numerous features that are not necessary to a complete understanding of this disclosure. For instance, although all of the details of the control subsystem 20 are not illustrated, those skilled in the art will recognize that the control subsystem 20 comprises one or several general-purpose or special-purpose microprocessors or other microcontrollers programmed with suitable software and/or firmware to carry out some or all of the functionality of the mobile terminal 16 described herein. In addition or alternatively, the control subsystem 20 may comprise various digital hardware blocks (e.g., one or more Application Specific Integrated Circuits (ASICs), one or more off-the-shelf digital and analog hardware components, or a combination thereof) configured to carry out some or all of the functionality of the mobile terminal 16 described herein.

The systems and methods described herein enable efficient and highly accurate RSRP measurements. From the disclosure, it is clear that the systems and methods disclosed herein mitigate the impact of inter-cell interference on the RSRP measurements. As a result, the mobile terminal 16 is enabled to satisfy accuracy requirements for RSRP measurements imposed by the cellular communications network 10 with a smaller number of time-frequency samples, which in turn reduces power consumption of the mobile terminal 16. Also, it may be possible to introduce a new reference signal having a lower density requirement (or to lessen a density requirement of an existing reference signal) without relaxing current measurement accuracy requirements. In addition or alternatively, the systems and methods disclosed herein may be used obtain RSRP measurements with greater accuracy than conventionally obtainable (e.g., can be used to satisfy heightened accuracy requirements).

The following acronyms are used throughout this disclosure.
 ASIC Application Specific Integrated Circuit
 AWGN Additive White Gaussian Noise
 CRS Cell-Specific Reference Signal
 LTE Long Term Evolution
 LUT Look-Up Table
 PSS Primary Synchronization Signal
 RB Resource Block
 RBP Resource Block Pair
 RE Resource Element
 RSRP Reference Signal Received Power
 SSS Secondary Reference Signal Those skilled in the art will recognize improvements and modifications to the preferred embodiments of the present disclosure. All such improvements and modifications are considered within the scope of the concepts disclosed herein and the claims that follow.

What is claimed is:

1. A method of operation of a mobile terminal in a cellular communications network to obtain a measurement of received signal power for a measured cell, comprising:
 selecting a plurality of weighting parameters for a plurality of time-frequency samples of a reference signal of a measured cell based, at least in part, on inter-cell interference from one or more synchronized interfering cells having reference signals that occupy the same time and frequency resources as reference signals of the measured cell and inter-cell interference from one or more non-synchronized interfering cells having reference signals that do not occupy the same time and frequency resources as reference signals of the measured cell, wherein each weighting parameter of the plurality of weighting parameters is for a different one of the plurality of time-frequency samples of the reference signal of the measured cell;

applying the plurality of time-frequency samples of the reference signal of the measured cell and the plurality of weighting parameters for the plurality of time-frequency samples of the reference signal of the measured cell to a corresponding plurality of time-frequency samples of a received signal from the measured cell to obtain a measurement of a received signal power for the measured cell; and reporting the measurement of the received signal power from the measured cell to the cellular communications network.

2. The method of claim 1 wherein selecting the plurality of weighting parameters comprises selecting the plurality of weighting parameters such that a combined impact of the inter-cell interference from the one or more synchronized interfering cells and noise comprising the inter-cell interference from the one or more non-synchronized interfering cells plus thermal noise on the measurement of the received signal power is reduced.

3. The method of claim 1 wherein selecting the plurality of weighting parameters comprises selecting the plurality of weighting parameters such that a combined impact of the inter-cell interference from the one or more synchronized interfering cells and noise comprising the inter-cell interference from the one or more non-synchronized interfering cells plus thermal noise on the measurement of the received signal power is minimized.

4. The method of claim 1 wherein selecting the plurality of weighting parameters comprises:

determining that the inter-cell interference from the one or more synchronized interfering cells is greater than the inter-cell interference from the one or more non-synchronized interfering cells plus thermal noise; and in response, selecting the plurality of weighting parameters such that the plurality of weighting parameters at least reduce an impact of the inter-cell interference from the one or more synchronized interfering cells on the measurement of the received signal power.

5. The method of claim 4 wherein selecting the plurality of weighting parameters such that the plurality of weighting parameters at least reduce the impact of the inter-cell interference from the one or more synchronized interfering cells on the measurement of the received signal power comprises selecting the weighting parameters such that the impact of the inter-cell interference from the one or more synchronized interfering cells on the measurement of the received signal power is minimized.

6. The method of claim 4 wherein selecting the plurality of weighting parameters such that the plurality of weighting parameters at least reduce the impact of the inter-cell interference from the one or more synchronized interfering cells on the measurement of the received signal power comprises selecting the plurality of weighting parameters such that a cross-correlation between $X_{n,k}/A_{n,k}$ and the reference signals of the one or more synchronized interfering cells is minimized, wherein $X_{n,k}$ is an n-th time-frequency sample of the reference signal of the measured cell in a k-th coherent time-frequency window and $A_{n,k}$ is one of the plurality of weighting parameters for the n-th time-frequency sample of the reference signal of the measured cell in a k-th coherent time-frequency window.

7. The method of claim 4 wherein the plurality of weighting parameters are inversely related to a cross-correlation between the reference signal of the measured cell and the reference signals of the one or more synchronized interfering cells.

8. The method of claim 4 wherein the plurality of weighting parameters are such that only ones of the plurality of time-frequency samples of the received signal where a cross-correlation between the reference signal of the measured signal and the reference signals of the one or more synchronized interfering cells is less than a predefined threshold are used for the measurement of the received signal power from the measured cell.

9. The method of claim 4 wherein selecting the plurality of weighting parameters such that the plurality of weighting parameters at least reduce the impact of the inter-cell interference from the one or more synchronized interfering cells on the measurement of the received signal power comprises:

determining that the reference signal of the measured cell and the reference signal for at least one of the one or more synchronized interfering cells are the same sequence on even subcarriers; and in response, selecting the plurality of weighting parameters such that an impact of the even subcarriers of the reference signal of the at least one of the one or more synchronized interfering cells on the measurement of the received signal power is at least reduced.

10. The method of claim 4 wherein selecting the plurality of weighting parameters such that the plurality of weighting parameters at least reduce the impact of the inter-cell interference from the one or more synchronized interfering cells on the measurement of the received signal power comprises:

determining that the reference signal of the measured cell and the reference signal for at least one of the one or more synchronized interfering cells are the same sequence on odd subcarriers; and in response, selecting the plurality of weighting parameters such that an impact of the odd subcarriers of the reference signal of the at least one of the one or more synchronized interfering cells on the measurement of the received signal power is at least reduced.

11. The method of claim 1 wherein selecting the plurality of weighting parameters comprises:

determining that the inter-cell interference from the one or more non-synchronized interfering cells plus thermal noise is greater than the inter-cell interference from the one or more synchronized interfering cells; and in response, selecting the plurality of weighting parameters such that the plurality of weighting parameters at least reduce noise comprising the inter-cell interference from the one or more non-synchronized interfering cells plus the thermal noise.

12. The method of claim 1 wherein selecting the plurality of weighting parameters comprises:

determining a first plurality of weighting parameters for the plurality of time-frequency samples of the reference signal of the measured cell that at least reduce an impact of the inter-cell interference from the one or more synchronized interfering cells on the measurement of the received signal power;

determining a second plurality of weighting parameters for the plurality of time-frequency samples of the reference signal of the measured cell that at least reduce noise comprising the inter-cell interference from the one or more non-synchronized interfering cells plus thermal noise; and combining the first plurality of weighting parameters and the second plurality of weighting parameters to provide the plurality of weighting parameters.

13. The method of claim 12 wherein:
the first plurality of weighting parameters minimize a cross-correlation between $X_{n,k}/A_{n,k}$ and the reference signals of the one or more synchronized interfering cells, wherein $X_{n,k}$ is an n-th time-frequency sample of the reference signal of the measured cell in a k-th coherent time-frequency window and $A_{n,k}$ is one of the plurality of weighting parameters for the n-th time-frequency sample of the reference signal of the measured cell in a k-th coherent time-frequency window; and
the second plurality of weighting parameters minimize the noise comprising the inter-cell interference from the one or more non-synchronized interfering cells plus the thermal noise.

14. The method of claim 12 wherein combining the first plurality of weighting parameters and the second plurality of weighting parameters comprises combining the first plurality of weighting parameters and the second plurality of weighting parameters according to a relative received signal power of the one or more synchronized interfering cells and the one or more non-synchronized interfering cells plus the thermal noise.

15. The method of claim 1 wherein selecting the plurality of weighting parameters comprises:
determining a received signal power for each of the one or more synchronized interfering cells;
determining a received signal power for each of the one or more non-synchronized interfering cells;
determining a received power for thermal noise;
determining a first plurality of weighting parameters for the plurality of time-frequency samples of the reference signal of the measured cell that at least reduce an impact of the inter-cell interference from the one or more synchronized interfering cells on the measurement of the received signal power;
determining a second plurality of weighting parameters for the plurality of time-frequency samples of the reference signal of the measured cell that at least reduce noise comprising the inter-cell interference from the one or more non-synchronized interfering cells plus the thermal noise; and
combining the first plurality of weighting parameters and the second plurality of weighting parameters according to relative received signal power of the one or more synchronized interfering cells and the one or more non-synchronized interfering cells plus the thermal noise.

16. The method of claim 15 wherein:
the first plurality of weighting parameters minimize a cross-correlation between $X_{n,k}/A_{n,k}$ and the reference signals of the one or more synchronized interfering cells, wherein $X_{n,k}$ is an n-th time-frequency sample of the reference signal of the measured cell in a k-th coherent time-frequency window and $A_{n,k}$ is one of the plurality of weighting parameters for the n-th time-frequency sample of the reference signal of the measured cell in a k-th coherent time-frequency window; and
the second plurality of weighting parameters minimize the noise comprising the inter-cell interference from the one or more non-synchronized interfering cells plus the thermal noise.

17. The method of claim 1 wherein selecting the plurality of weighting parameters comprises:
determining a first plurality of weighting parameters for the plurality of time-frequency samples of the reference signal of the measured cell that at least reduce an impact of the inter-cell interference from the one or more synchronized interfering cells on the measurement of the received signal power;
determining a second plurality of weighting parameters for the plurality of time-frequency samples of the reference signal of the measured cell that at least reduce noise comprising the inter-cell interference from the one or more non-synchronized interfering cells plus the thermal noise;
determining which of the first plurality of weighting parameters and the second plurality of weighting parameters provide a best plurality of weighting parameters that provide a greatest measurement accuracy of the received signal power from the measured cell; and
selecting the best plurality of weighting parameters as the plurality of weighting parameters.

18. The method of claim 17 wherein:
the first plurality of weighting parameters minimize a cross-correlation between $X_{n,k}/A_{n,k}$ and the reference signals of the one or more synchronized interfering cells, wherein $X_{n,k}$ is an n-th time-frequency sample of the reference signal of the measured cell in a k-th coherent time-frequency window and $A_{n,k}$ is one of the plurality of weighting parameters for the n-th time-frequency sample of the reference signal of the measured cell in a k-th coherent time-frequency window; and
the second plurality of weighting parameters minimize the noise comprising the inter-cell interference from the one or more non-synchronized interfering cells plus the thermal noise.

19. The method of claim 17 wherein determining which of the first plurality of weighting parameters and the second plurality of weighting parameters provide the best plurality of weighting parameters comprises:
applying the plurality of time-frequency samples of the reference signal of the measured cell and the first plurality of weighting parameters for the plurality of time-frequency samples of the reference signal of the measured cell to a corresponding plurality of time-frequency samples of the received signal from the measured cell to obtain a first measurement of the received signal power;
applying the plurality of time-frequency samples of the reference signal of the measured cell and the second plurality of weighting parameters for the plurality of time-frequency samples of the reference signal of the measured cell to a corresponding plurality of time-frequency samples of the received signal from the measured cell to obtain a second measurement of the received signal power;
determining that the first plurality of weighting parameters is the best plurality of weighting parameters if an accuracy of the first measurement of the received signal power is greater than an accuracy of the second measurement of the received signal power; and
determining that the second plurality of weighting parameters is the best plurality of weighting parameters if the accuracy of the second measurement of the received signal power is greater than the accuracy of the first measurement of the received signal power.

20. The method of claim 1 wherein the cellular communications network is a Long Term Evolution cellular communications network, and the measurement of the received signal power is a reference signal received power measurement.

21. The method of claim 20 wherein the reference signal of the measured cell is a cell-specific reference signal of the measured cell, the reference signals of the one or more synchronized interfering cells are cell-specific reference signals, and the reference signals of the one or more non-synchronized interfering cells are cell-specific reference signals.

22. The method of claim 1 further comprising performing a cell search to identify a plurality of cells in the cellular communications network, the plurality of cells comprising the measured cell, the one or more synchronized interfering cells, and the one or more non-synchronized interfering cells.

23. A mobile terminal for a cellular communications network, comprising:
a transceiver subsystem comprising at least one processor or circuit configured to send wireless communication signals to and receive wireless communication signals from the cellular communications network; and
a control subsystem associated with the transceiver subsystem and comprising at least one processor or circuit, the control subsystem configured to:
select a plurality of weighting parameters for a plurality of time-frequency samples of a reference signal of a measured cell based, at least in part, on inter-cell interference from one or more synchronized interfering cells having reference signals that occupy the same time and frequency resources as reference signals of the measured cell and inter-cell interference from one or more non-synchronized interfering cells having reference signals that do not occupy the same time and frequency resources as reference signals of the measured cell, wherein each weighting parameter of the plurality of weighting parameters is for a different one of the plurality of time-frequency samples of the reference signal of the measured cell;
apply the plurality of time-frequency samples of the reference signal of the measured cell and the plurality of weighting parameters for the plurality of time-frequency samples of the reference signal of the measured cell to a corresponding plurality of time-frequency samples of a received signal from the measured cell to obtain a measurement of the received signal power for the measured cell; and
report the measurement of the received signal power from the measured cell to the cellular communications network.

* * * * *